United States Patent Office 3,406,313
Patented Oct. 15, 1968

3,406,313
TIME SAMPLING CIRCUIT FOR AN OSCILLOSCOPE
Harlan W. Lefevre, Eugene, Oreg., and Donald L. Wieber, Orinda, Calif., assignors to the United States of America as represented by the United States Atomic Energy Commission
Filed Dec. 14, 1965, Ser. No. 513,862
8 Claims. (Cl. 315—22)

ABSTRACT OF THE DISCLOSURE

An oscilloscope circuit for displaying the waveform of very rapid, repetitive signals by time sampling. A fast ramp signal added to each input pulse is applied across a tunnel diode. The tunnel diode is back biased by a very slowly changing ramp signal. An X-deflection signal for an oscilloscope is derived in a time-to-height converter with an amplitude proportional to the time from the start of each input pulse until the tunnel diode conducts while Y-deflection is obtained from the slow ramp signal. The input signal waveform may be displayed as a line of dots.

---

Figure 1:
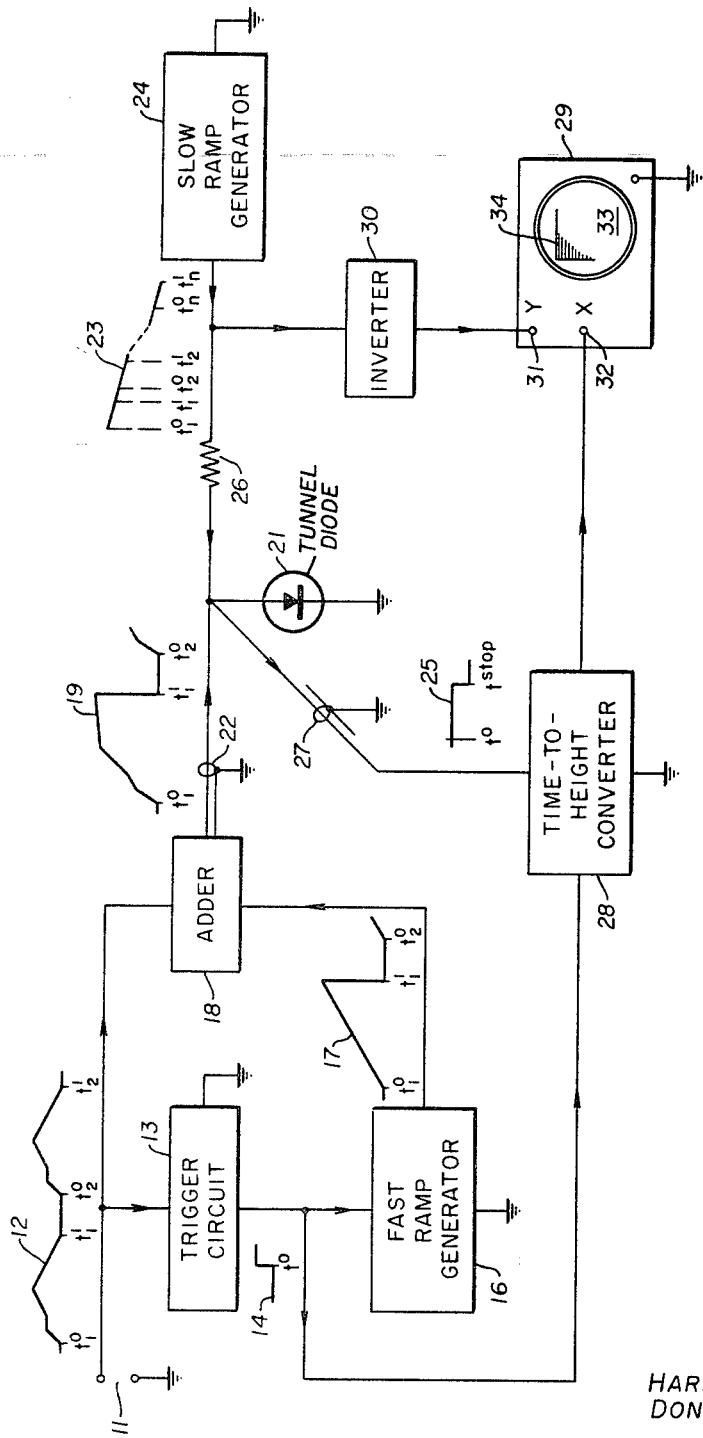

This invention relates generally to high speed oscillography and more particularly to electronic sampling circuitry capable of obtaining an oscilloscope image of very rapid, repetitive electrical pulses with subnanosecond rise times, (i.e., less than $1 \cdot 10^{-9}$ second rise time). The invention described herein was made in the course of, or under Contract W-7405-eng-48 with the Atomic Energy Commission.

In conventional oscilloscopes, a complete image of a repetitive input signal is displayed during each time base period. In an amplitude sampling oscilloscope however, a single increment or point along the waveform of the input signal is sampled and displayed during each time base period, successive increments of the input signal being sampled during successive time base periods. A composite image of the input waveform is then reconstructed from the results of the samplings. Such sampling method is advantageous over the conventional oscilloscope for displaying the waveform of a very fast input signal in that the bandwidth of the input signal may be higher than the maximum bandwidth capability of the oscilloscope amplifiers. Waveforms of very rapid signals can be displayed by sampling techniques which cannot be displayed by conventional techniques.

The present invention is a new type of sampling oscilloscope circuit in that the input signal is time sampled rather than amplitude sampled, that is, in amplitude sampling, the image of the waveform is the result of sampling the amplitude of the input signal at evenly spaced time intervals. In the present invention the time at which an input signal reaches a specified voltage level is determined, the specified voltage being changed for each sampling. The resulting presentation on the oscilloscope screen is essentially the same using either sampling method, but the present invention has the primary advantage of a wide bandwidth (the wider the bandwidth, the faster the input pulse rise time which may be accurately displayed) which is limited only by the rise time of the time sampling element. Such element can be an inexpensive fast regenerative device such as a tunnel diode which has a bandwidth of several gigacycles ($1 \cdot 10^9$ cycles). In the amplitude sampling oscilloscope the bandwidth is dependent upon the narrowness of the sampling pulse which can be generated. Such a sampling pulse must have both a rise and fall time. Thus the present invention has a capability of displaying waveforms of more rapid pulses than does the amplitude sampling oscilloscope.

It is an object of the present invention to provide oscilloscope means for displaying the waveform of a repetitive input pulse containing frequency components higher than the maximum frequency capability of the oscilloscope amplifiers.

It is an object of the present invention to provide a sampling oscilloscope which is relatively simple to construct.

It is another object of the present invention to provide a sampling oscilloscope capable of improved resolution, for rapid pulses, over previous sampling oscilloscopes.

It is another object of the present invention to provide a sampling oscilloscope which is relatively inexpensive.

It is another object of the present invention to provide a new sampling oscilloscope having a very wide bandwidth.

Figure 2:
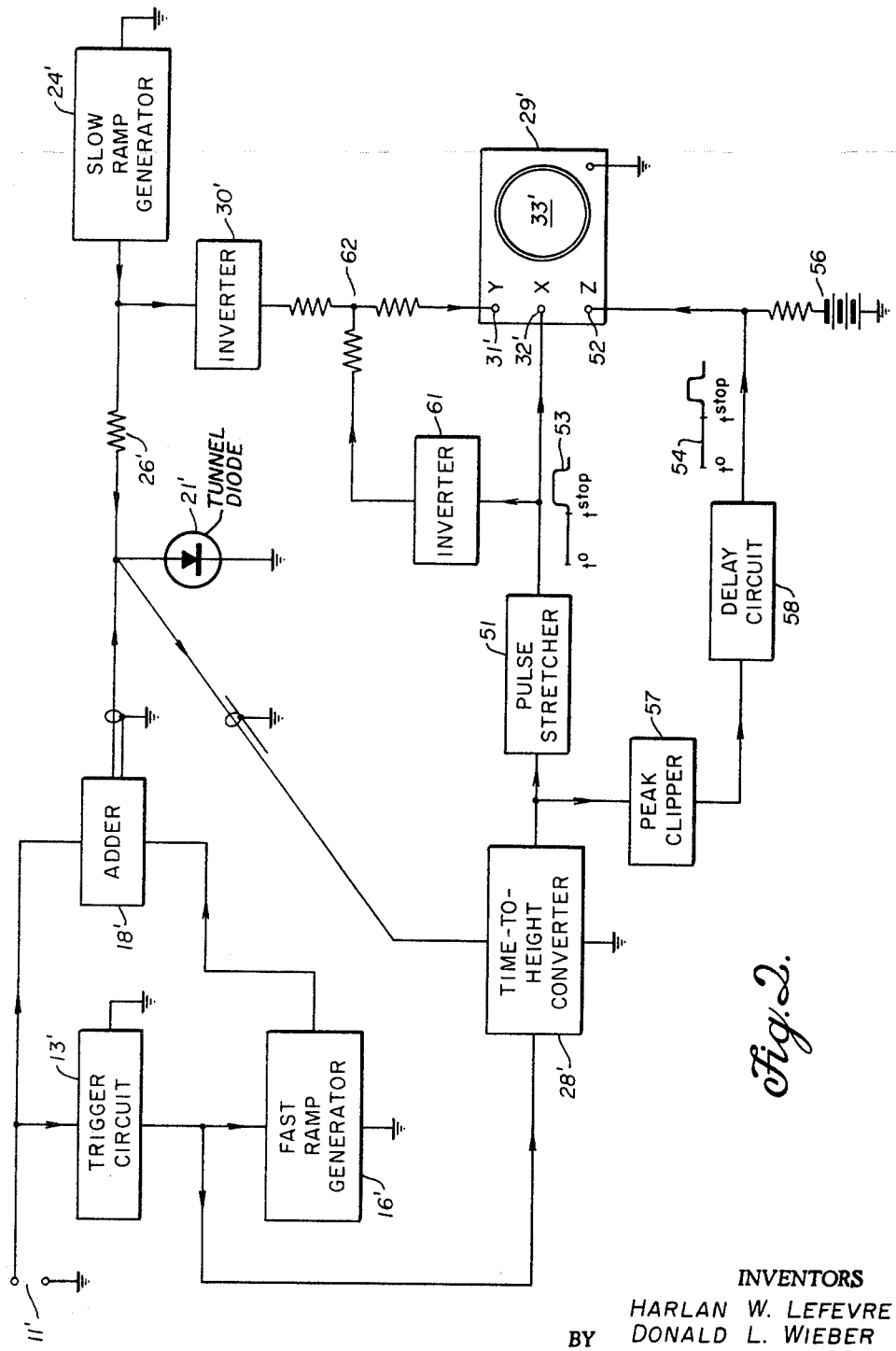

The invention will be best understood by reference to the following specification and the accompanying drawing of which:

FIGURE 1 is a circuit diagram of a sampling oscilloscope according to the present invention, and FIGURE 2 is a circuit diagram of the invention with additional circuitry for providing a more readily interpreted presentation of input signals on the oscilloscope screen.

Referring now to FIGURE 1, there is shown an input terminal 11 for receiving a fast-rise, repetitive input signal. The waveform 12 of a typical input pulse signal is shown and is assumed to start at time $t^0$ and end at time $t^1$ as indicated in the drawing. The subsequent repetitions of the input signal are indicated in the figure by a subscript i.e., $t_1^0, t_2^0 \ldots t_n^0$. It is necessary to obtain a trigger signal for activating the oscilloscope at the start of each input pulse 12. In some instances such a signal is obtainable from the input signal source, however if no trigger signal is obtainable from such source a trigger circuit 13 must be provided. To provide a trigger signal in this case a portion of the input signal 12 from the input terminal 11 is applied to the circuit 13 which provides a fast trigger signal at the beginning of each occurrence of the input signal.

A trigger signal 14 from the circuit 13 is received by a fast ramp generator 16 which creates a sawtooth or fast ramp signal 17 having, for example, a positive slope. If the negative slopes of the signal 12 are to be displayed with fidelity, the positive slope of the ramp signal 17 must be greater than any negative slope in the input signal 12, so that when the input signal 12 and ramp signal 17 are added together in an adder 18, the resultant added signal 19 has only positive slopes. The added signal 19 from the adder 18 is applied to the anode of a tunnel diode 21. With the very fast signals handled in the present invention, it is necessary to conduct the various signals through a transmission line such as a coaxial cable 22. The outer shield conductor of a cable is generally connected to ground, as indicated in FIGURE 1. The cathode of the tunnel diode 21 is connected to ground potential.

The added signal 19 is applied to the anode of the tunnel diode 21. Simultaneously, a slow ramp signal 23 from a generator 24 is coupled through a resistor 26 to the anode of the tunnel diode 21. The slow ramp signal 23 has a much longer time base than the other waveforms indicated in FIGURE 1. The input signal 12, the fast ramp 17 and the resultant added signal 19 all re-occur many times during one sweep of the slow ramp signal 23, as indicated in FIGURE 1 by the occurrence of times $t_1^0$, $t_2^0 \ldots t_n^0$ and $t_1^1, t_2^1$ and $t_n^1$ during a single sweep of the slow ramp signal. The slow ramp signal 23 preferably, but not necessarily, slopes in a direction opposite to the fast ramp signal 17, that is, the waveform of one ramp signal will have a negative slope while the waveform of the other ramp signal has a positive slope.

There are two signals simultaneously applied across the tunnel diode 21: the added signal 19 (which is the summation of the input signal 12 and the fast ramp signal 17) and the slow ramp signal 23. During a single occurrence of the input signal 12, the slow ramp signal 23 does not change significantly so that for such short time the slow ramp signal potential may be considered as an essentially steady state inverse bias across the tunnel diode 21. Ordinarily, the potential of the slow ramp signal 23 is essentially zero at start time $t_1{}^0$ and goes toward a negative potential while the potential of added signal 19 is zero between each pair of pulses, from $t^1$ to $t^0$. (For highest accuracy, the slow ramp signal 23 might be set slightly positive at time $t_1{}^0$ to offset the peak-point voltage, $Vp$, of the tunnel diode.) The slope of slow ramp signal 23 has been greatly exaggerated as shown in FIGURE 1 to better show the slope. In normal usage several hundred samplings would be made, therefore the rate of change of slow ramp signal 23 would be very small from one sampling to the next. Within the short time period of a single added pulse 19, the change in the inverse bias applied across tunnel diode 21 by slow ramp signal 23 is so slight that it may be considered, for purposes of circuit analysis, as nearly a steady state potential over such short time period. The potential of the added signal 19 increases until the slow ramp signal bias is overcome and negative resistance conduction occurs in the tunnel diode 21. When the summation of such signals is sufficient to cause the tunnel diode 21 to have negative resistance, a regenerative current pulse 25 is created through the tunnel diode which pulse is coupled through a coaxial line 27 and applied to a time-to-height converter 28 as a stop pulse. The time-to-height converter 28 is a conventional circuit producing an output signal having an amplitude proportional to the time elapsing between a start pulse 14, in this instance received from the trigger circuit 13, and the stop pulse 25 from the tunnel diode 21. A conventional oscilloscope 29 has a vertical or Y-axis terminal 31 connected to the output of the slow ramp generator 24 through a signal inverter 30 while a horizontal or X-axis terminal 32 is connected to the output of the time-to-height converter 28. The waveform of added signal 19 is produced on the oscilloscope screen 33 as a result of many time samplings of the input signal 12.

In the operation of the circuit as shown in FIGURE 1, the slow ramp signal 23 causes the oscilloscope beam to be deflected upward across the screen 33 at a constant rate. The time-to-height converter 28 produces a pulse after each triggering of the tunnel diode 21, the pulse having an amplitude proportional to the time elapsing between the start of each fast ramp pulse 17 and the triggering of the current pulse through the tunnel diode. The oscilloscope 29 beam is momentarily deflected to the right for a distance proportional to the pulse height. Thus the image on the screen 33 is a solid brightened region 34, one side being the Y-axis and the other side of the region having the shape of the waveform of the added signal 19.

It might be preferred that the waveform be presented on the oscilloscope screen in a more conventional manner, that is, the more usual single line waveform representation. Furthermore, it may be preferred that the waveform presented on the oscilloscope screen 33 be that of only the input signal 12 rather than the summation 19 of the input signal and the fast ramp signal 17. Another embodiment of the invention shown in FIGURE 2 provides such a single line representation of only the input signal.

Referring now to FIGURE 2 there is shown additional circuitry by which a single line waveform is provided. The circuit of FIGURE 2 includes that of FIGURE 1 with corresponding elements, identified by reference numerals having prime marks thereon, being connected in a similar manner except as hereinafter described.

A pulse stretcher 51 is connected between the time-to-height converter 28' and the X-axis input terminal 32' of oscilloscope 29'. The pulse stretcher produces a stretched pulse 53 obtained by increasing the duration of the output pulses from the time-to-height converter so that the beam in the oscilloscope 29' remains deflected for a relatively long period of time. The beam in the oscilloscope 29' is maintained in a normally blanked condition either by a negative bias voltage supply 56 connected to a Z-axis terminal 52 of the oscilloscope 29' as shown, or by an equivalent internal bias or brightness control as provided in most oscilloscopes. An unblanking pulse 54 is applied to a Z or beam intensity control 52 of the oscilloscope 29', such pulse 54 occurring during the time the oscilloscope beam is deflected by the stretched pulse 53. To create the unblanking pulse, a peak clipper 57 is connected to the output of the time-to-height converter 28' and converts the amplitude of all pulses received therefrom to a common level. Such pulses are then delayed in a delay circuit 58 to create the unblanking pulse 54, which occurs between the start and end of the stretched pulse 53.

In operation, the stretched pulse 53 provides a steady-state deflection potential to the X-terminal 32' so that during the time the oscilloscope 29' beam is unblanked by pulse 54, only a single spot of light on the screen 33' is created. The final curve is formed by many such spots of light on the screen 33'.

To further increase the convenience of the presentation of the curve on the screen 33', a second inverter circuit 61 is connected from the output of the pulse stretcher 51 to an adder 62 wherein signals from the pulse stretcher are added to the Y-vertical deflection signal from the inverter 30'. Such alteration of the Y-deflection signal subtracts the fast ramp signal component from the waveform shown on the screen 33', thus the waveform of only the input signal is shown. To obtain only the input signal waveform, the adder 62 is adjusted so that the component of the inverted pulse stretcher signal resulting from the fast ramp signal just cancels the inverted slow ramp signal. For example, in the absence of an input signal, only the fast ramp signal 17 will be present and so the amplitude of stretched pulse 53 will increase by equal increments for each successive sampling. At the same time, the amplitude of slow ramp signal 23 from slow ramp generator 24' will also be steadily increasing at a constant rate, but in the opposite sense or polarity from the stretched pulse 53. The inverted signals exactly cancel in the adder 62 so that the Y-deflection stays at a zero value and a straight line of dots is formed along the X-axis.

When an input signal is present, the input signal added to the fast ramp signal causes the tunnel diode 21 to conduct at an earlier time after $t^0$ in the sampling cycle than if there were no input signal present. Since the elapsed time is shorter, the amplitude of stretched pulse 53 is reduced correspondingly and the resultant Y-signal from adder 62 will have a positive amplitude. Therefore, for a particular sampling, an input signal causes the amplitude of stretched pulse 53 to be reduced, relative to the no input signal level, by an amount corresponding to the input signal amplitude and thus a Y signal is generated in adder 63.

The circuit of FIGURE 2 will ordinarily be preferred over that of FIGURE 1 in that the input waveform presented on the screen 33' is shown in a more usual type of oscilloscope presentation.

The polarities of the various signals discussed with regard to the embodiments of both FIGURES 1 and 2 may differ from those shown without departing from the basic concept of the invention. Also, the various signals may be derived and combined in various ways, and the connections to the tunnel diode 21 may be altered. Also, the operation of the invention is not restricted to the use of a tunnel diode since similar operation is possible with other sensitive fast regenerative devices.

While the invention has been disclosed with respect to specific embodiments, it will be apparent to those skilled in the art that numerous variations and modifications may be made within the spirit and scope of the invention and it is not intended to limit the invention except as defined in the following claims.

What is claimed is:

1. In a sampling oscilloscope circuit for displaying the waveform of a repetitive pulse input signal, the combination comprising means deriving a trigger signal designating the start of each said input pulse, a fast ramp signal generator receiving said trigger signal and providing a ramp signal concurrently with each said pulse input signal, an adding circuit combining said fast ramp signal with said input signal to provide a summation signal, a slow ramp signal generator providing a slow ramp signal with a duration extending over the occurrence of many of said input signals, a sensitive fast regenerative circuit element receiving said summation signal and said slow ramp signal, a time-to-height converter coupled to the output of said means deriving a trigger signal and connected across said circuit element and having an elapsed time signal with an amplitude proportional to the elapsed time between the occurrence of said trigger signal and the onset of regeneration in said circuit element, and display means coupled to outputs of said slow ramp generator and said time-to-height converter and providing a display of said slow ramp signal versus said elapsed time signal.

2. In a sampling oscilloscope circuit for graphically displaying the waveform of a fast repetitive input pulse signal from a source, the combination comprising a trigger circuit coupled to said source and providing a trigger signal time related to the onset of each said input signal, a fast ramp generator connected to said trigger circuit and providing a fast ramp signal simultaneously with each said input signal, an adder circuit receiving said input signal and said fast ramp signal and providing a resultant added signal, a slow ramp generator providing a slow ramp signal having a period lasting over many occurrences of said input signal, a sensitive fast regenerative device having said added signal and said slow ramp signal applied thereto, a time-to-height converter having first and second input terminals and receiving said trigger signal from said trigger circuit at said first input terminal and having said second input terminal connected across said device, said time-to-height converter being of the class in which an output pulse is produced having an amplitude proportional to the time elapsing between receipt of a pulse at said first input terminal and receipt of a succeeding pulse at said second input terminal, and an oscilloscope having first and second electron beam deflecting means operative in transverse directions, said first beam deflecting means receiving output signals from said time-to-height converter, said second beam deflecting means receiving said slow ramp signal from said slow ramp generator.

3. A sampling oscilloscope circuit as described in claim 2 wherein said sensitive fast regenerative device is a tunnel diode.

4. A sampling oscilloscope circuit as described in claim 2 and comprising the further combination of a signal inverting circuit connected between said slow ramp generator and said second beam deflecting means.

5. In a sampling oscilloscope circuit for graphically displaying the waveform of a very fast repetitive input pulse, the combination comprising a trigger circuit receiving said input pulse and providing a trigger signal having a constant time relationship to the start of said input pulse, a fast ramp generator coupled to said trigger circuit and adapted to generate a fast ramp signal upon receipt of each of said trigger signals, the magnitude of the slope of said fast ramp pulse exceeding the maximum slope of opposite sign of said input pulse, a generator producing a slow ramp signal having a period many times longer than the period of said fast ramp signal, a tunnel diode, means combining said input signal and the outputs of said slow ramp generator and said fast ramp generator across said tunnel diode, a time-to-height converter having first and second input terminals and of the class creating an output pulse having an amplitude proportional to the time elapsing between a start pulse and a stop pulse received at said first and said second time-to-height converter input terminals respectively, said first time-to-height input terminal being connected to receive said trigger signal from said trigger circuit, said second time-to-height converter input terminal being connected across said tunnel diode, and an oscilloscope having an X-input terminal connected to the output of said time-to-height converter and having a Y-input terminal connected to the output of said slow ramp generator.

6. A sampling oscilloscope circuit as described in claim 5 wherein said oscilloscope is of the class having a beam intensity control, further comprising a pulse stretcher connected between the output of said time-to-height converter and said X-input terminal of said oscilloscope, a peak clipper coupled to the output of said time-to-height converter, a delay circuit having a delay time longer than the rise time of pulse signals at the output of said pulse stretcher and connected in series with said peak clipper from the output of said pulse-to-height converter to said intensity control of said oscilloscope, whereby a display on the screen of said oscilloscope is presented as a line of brightened spots.

7. A sampling oscilloscope circuit as described in claim 5 wherein said oscilloscope has a beam intensity control and comprising the further combination of a first signal inverter connected between the output of said slow ramp generator and said Y-input terminal, a pulse stretcher connected from the output of said time-to-height converter to said X-input, a peak clipper, a delay circuit connected in series with said peak clipper from the output of said time-to-height converter to said intensity control, and a second signal inverter having an input terminal connected to said X-input terminal, and means mixing the output of said second inverter with the output of said first inverter, whereby the waveform of only said input pulse is presented on the screen of said oscilloscope.

8. In a time sampling oscilloscope circuit for graphically displaying the waveform of a very fast repetitive input signal, the combination comprising a trigger circuit receiving said input signal and being of the class providing a trigger signal at a time related to the occurrence of said input signal, a fast ramp generator of the class providing an output fast ramp signal having a constant slope and a duration approximately the same as the duration of said input signal, the operation of said fast ramp generator being initiated in response to said trigger signal, a first adder circuit receiving said input signal and said fast ramp signal and providing an adder output signal, a slow ramp generator producing a slow ramp signal having a duration extending over many repetitions of said input signal and with a slope of sign opposite that of said fast ramp signal, a tunnel diode having said added signal and said slow ramp signal applied thereacross and being of the type in which a current pulse is created through said diode when negative resistance occurs therein, a time-to-height converter having an input connected to output of said trigger circuit and an input connected across said tunnel diode and of the class providing an output signal having an amplitude proportional to the time elapsing between a start input pulse from said trigger circuit and a current pulse in said tunnel diode, a pulse stretching means receiving output signals from said time-to-height converter, an oscilloscope having a first beam deflection terminal and having a second beam deflection terminal connected to the output of said pulse stretching means, said oscilloscope having a beam intensity control, means providing a beam turn-on pulse to said intensity control in response to an output signal from said time-to-height converter, and a second adder circuit receiving the output signal of said slow ramp generator and the output signal of said time-to-height converter and providing a combined output signal to the first deflection terminal of said oscilloscope.

References Cited

UNITED STATES PATENTS 2,951,181   8/1960   Sugarman.

RODNEY D. BENNETT, *Primary Examiner.*

T. H. TUBBESING, *Assistant Examiner.*